US011000921B2

(12) United States Patent
Zheng et al.

(10) Patent No.: US 11,000,921 B2
(45) Date of Patent: May 11, 2021

(54) COMPOSITE WELDING RODS AND ASSOCIATED CLADDED ARTICLES

(71) Applicant: Kennametal Inc., Latrobe, PA (US)

(72) Inventors: Qingjun Zheng, Export, PA (US); Robert J. Vasinko, Latrobe, PA (US)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 16/396,123

(22) Filed: Apr. 26, 2019

(65) Prior Publication Data

US 2020/0338672 A1 Oct. 29, 2020

(51) Int. Cl.
*B23K 35/30* (2006.01)
*C22C 19/00* (2006.01)
*C22C 29/08* (2006.01)

(52) U.S. Cl.
CPC ...... *B23K 35/3033* (2013.01); *B23K 35/3046* (2013.01); *C22C 19/00* (2013.01); *C22C 29/08* (2013.01)

(58) Field of Classification Search
CPC ............ B23K 35/3033; B23K 35/3046; C22C 29/08; C22C 19/00
See application file for complete search history.

(56) References Cited

U.S. PATENT DOCUMENTS 2,180,813 A 11/1939 Marvin
3,334,975 A 8/1967 Quaas
4,682,987 A 7/1987 Brady
5,250,355 A * 10/1993 Newman ........... B23K 35/0272 219/146.1
5,715,899 A 2/1998 Liang
5,740,872 A 4/1998 Smith
6,248,149 B1 * 6/2001 Massey ............... B23K 35/327 175/374
6,361,739 B1 3/2002 Sreshta
7,387,763 B2 6/2008 Kelly
7,548,067 B2 6/2009 Cheung
7,597,159 B2 10/2009 Overstreet
9,103,004 B2 8/2015 MacLeod
2010/0230173 A1 * 9/2010 Xia ........................ E21B 10/50 175/374
2011/0315668 A1 * 12/2011 Olsen ....................... B22F 5/12 219/146.23
2013/0200556 A1 8/2013 Jonsson

FOREIGN PATENT DOCUMENTS

CN 101462206 A 6/2009
DE 212013000163 U1 4/2015
FR 3011197 4/2015

OTHER PUBLICATIONS

Jan. 11, 2021 Office Action (non-US) DE App. No. 102020105725.
ASTM 2019.
ASTM 2016.

* cited by examiner

*Primary Examiner* — Daniel J. Schleis
*Assistant Examiner* — Kevin CT Li
(74) *Attorney, Agent, or Firm* — Larry R. Meenan

(57) ABSTRACT

Welding rods and associated cladded articles are described herein. Briefly, a welding rod comprises a hard particle component dispersed in a nickel-based alloy matrix or cobalt-based alloy matrix, the hard particle component comprising tungsten carbide particles having an average size of less than 45 μm, and the nickel-based alloy matrix or the cobalt-based alloy matrix comprising at least one metal carbide forming element.

22 Claims, 1 Drawing Sheet

Surface Finish of Eroded Surface

| Test Samples | Welding rod with coarse WC particles | Invention with fine WC aprticles |
|---|---|---|
| Sample 1 | 11.8 | 5.1 |
| Sample 2 | 11.4 | 4.5 |
| Sample 3 | 13.6 | 4 |
| Sample 4 | 16.5 | 5.5 |
| Average | 13.325 | 4.775 |

Surface Roughness Ra um

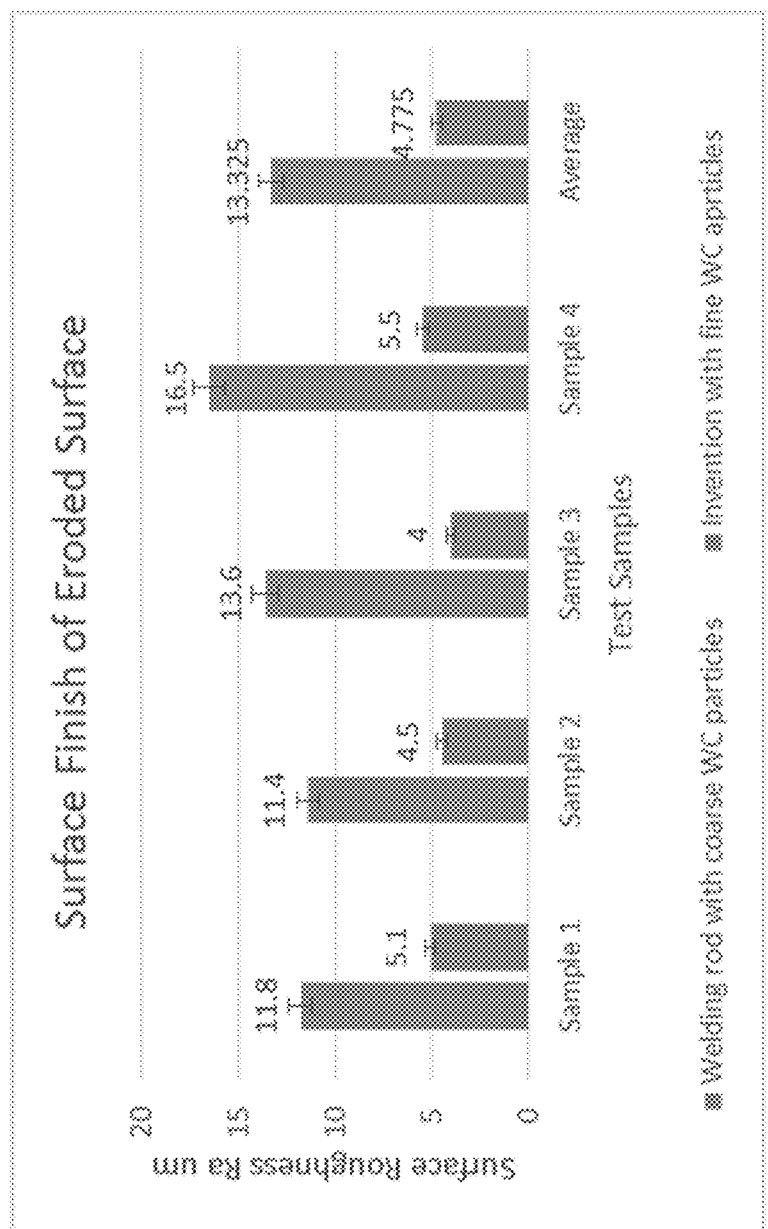
Surface Finish of Eroded Surface
Surface Roughness Ra um
20
15
10
5
0
11.8
5.1
11.4
4.5
13.6
4
16.5
5.5
13.325
4.775
Sample 1
Sample 2
Sample 3
Sample 4
Average
Test Samples
Welding rod with coarse WC particles
Invention with fine WC apricles

COMPOSITE WELDING RODS AND ASSOCIATED CLADDED ARTICLES

FIELD

The present application relates to welding rods and associated cladded articles and, in particular, to welding rods comprising hard particles dispersed in alloy matrix.

BACKGROUND

Claddings are often applied to articles or components subjected to harsh environments or operating conditions in efforts to extend the useful lifetime of the articles or components. Composite claddings can be applied to metallic substrates by a variety of techniques including weld overlay, thermal spray, laser cladding, infrared cladding or induction cladding. Conventional weld overlay processes employ hardfacing rods of various composition. One type of carbide hardfacing rod, for example, is a tubular rod composed of a steel tube and metal carbide particles positioned within the tube, with or without organic binder. Another type of welding rod consists of metal carbide particles partially densified in matrix alloy. Each of these rod constructions exhibits structural issues leading to deposition of claddings having inferior properties and performance. Tubular rods, for example, often have loose powder in the tube and a heterogeneous particle size distribution. This generates claddings of non-uniform structure and wear characteristics. The partially densified rods are weak and fracture easily during transportation and handling. In addition, partially densified rods exhibit interconnected porosity (like packed powder in a tube rod) which may be oxidized and/or absorb moisture from the environment, which can lead to welding defects.

SUMMARY

In view of these deficiencies, new welding rod compositions are described herein for production of claddings with desirable microstructure and/or enhanced wear and corrosion resistance. Briefly, a welding rod comprises a hard particle component dispersed in a nickel-based alloy matrix or cobalt-based alloy matrix, the hard particle component comprising tungsten carbide particles having an average size of less than 45 μm, and the nickel-based alloy matrix or the cobalt-based alloy matrix comprising at least one metal carbide forming element. In some embodiments, the tungsten carbide particles are present in the welding rod in an amount of at least 40 weight percent.

In another aspect, composite cladded articles are described herein. In some embodiments, a composite article comprises a metallic substrate, and a cladding adhered to the substrate, the cladding comprising a hard particle component dispersed in a nickel-based alloy matrix or cobalt-based alloy matrix, the hard particle component comprising tungsten carbide particles having an average size of less than 45 μm. The nickel-based alloy matrix or cobalt-based alloy matrix comprises at least one metal carbide forming element. As described further herein, the cladding can be adhered to the substrate via a weld overlay process.

In a further aspect, methods of cladding metallic substrates are provided. A method of cladding a metallic substrate, in some embodiments, comprises providing a welding rod comprising a hard particle component dispersed in a nickel-based alloy matrix or cobalt-based alloy matrix, the hard particle component comprising tungsten carbide particles having an average size of less than 45 μm, and the nickel-based alloy matrix or cobalt-based alloy matrix. In some embodiments, the nickel-based alloy or cobalt-based alloy comprises at least one metal carbide forming element. The cladding is deposited on the metallic substrate from the welding rod.

These and other embodiments are further described in the following detailed description.

BRIEF DESCRIPTION OF THE DRAWINGS

FIG. 1 provides surface roughness values of eroded claddings having structure and composition described herein relative to prior claddings formed from welding rods employing coarse tungsten carbide particles, according to some embodiments.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Welding Rods and Composite Articles

In one aspect, a welding rod comprises a hard particle component dispersed in a nickel-based alloy matrix or cobalt-based alloy matrix, the hard particle component comprising tungsten carbide particles having an average size of less than 45 μm, and the nickel-based alloy matrix or the cobalt-based alloy matrix comprising at least one metal carbide forming element.

In some embodiments, metal carbide forming elements of the nickel-based alloy or cobalt-based alloy matrix are selected from the group consisting of chromium, molybdenum, titanium, silicon, boron, and various mixtures thereof. Metal carbide forming elements can be present in the alloy matrix in any desired amount, including amounts sufficient to enhance wear and/or corrosion resistant properties of claddings deposited form the welding rod. Metal carbide forming elements, such as boron and/or silicon, may also be present in amounts sufficient to enhance liquid phase sintering and/or wetting of the hard particles during fabrication of the welding rod. For example, a metal carbide forming element can be present in the alloy matrix in an amount less than about 10 weight percent or less than about 5 weight percent. In some embodiments, a mixture of metal carbide forming elements is present in the alloy matrix in an amount less than about 10 weight percent or less than about 5 weight percent. Alternatively, a summation of metal carbide forming elements in the alloy matrix may exceed 10 weight percent. In such embodiments, each individual metal carbide forming element included in the summation may be present in the alloy matrix in an amount less than 10 weight percent or less than 5 weight percent. Weight percent of metal carbide forming elements is determined over the entire alloy matrix composition and is not limited to any local region of the alloy matrix. In some embodiments, the nickel-based alloy matrix or cobalt-based alloy matrix has a liquidus point less than 1200° C. or less than 1100° C.

Nickel-based alloy matrix of the welding rod can have a composition selected from Table I, in some embodiments.

TABLE I

| Nickel-based alloy matrix | |
|---|---|
| Element | Amount (wt. %) |
| Chromium | 0-30 |
| Molybdenum | 0-28 |
| Tungsten | 0-15 |
| Niobium | 0-6 |
| Tantalum | 0-6 |
| Titanium | 0-6 |
| Iron | 0-30 |
| Cobalt | 0-15 |
| Copper | 0-50 |
| Carbon | 0-2 |
| Manganese | 0-2 |
| Silicon | 0-10 |
| Phosphorus | 0-10 |
| Sulfur | 0-0.1 |
| Aluminum | 0-1 |
| Boron | 0-5 |
| Nickel | Balance |

For example, nickel-based alloy matrix can comprises 1-10 wt. % chromium, 0-5 wt. % molybdenum, 0-10 wt. % titanium, 0-5 wt. % silicon, 0-3 wt. % boron, 0-15 wt. % tungsten, 0-2 wt. % carbon and the balance nickel. Moreover, cobalt-based alloy of the welding rod can have a composition selected from Table II, in some embodiments.

TABLE II

| Cobalt-based alloy matrix | |
|---|---|
| Element | Amount (wt. %) |
| Chromium | 0-30 |
| Tungsten | 0-15 |
| Molybdenum | 0-20 |
| Nickel | 0-20 |
| Iron | 0-25 |
| Manganese | 0-2 |
| Silicon | 0-5 |
| Vanadium | 0-5 |
| Carbon | 0-4 |
| Boron | 0-5 |
| Copper | 0-5 |
| Cobalt | Balance |

In some embodiments, for example, cobalt-based alloy matrix comprises 3-10 wt. % chromium, 0-5 wt. % molybdenum, 0-10 wt. % titanium, 0-5 wt. % silicon, 0-3 wt. % boron, 0-15 wt. % tungsten, 0-2 wt. % carbon and the balance cobalt.

As described herein, welding rods comprise a hard particle component dispersed in the nickel-based alloy matrix or cobalt-based alloy matrix. The hard particle component comprises tungsten carbide particles having an average size less than 45 μm. In some embodiments, tungsten carbide particles of the hard particle component have an average size selected from Table III.

TABLE III

| Average tungsten carbide particle size (μm) |
|---|
| ≤40 |
| 10-43 |
| 15-40 |
| 20-43 |

Tungsten carbide particles of the hard particle component comprise macrocrystalline tungsten carbide, cast tungsten carbide, polycrystalline tungsten carbide containing metallic binder in an amount less than 3 weight percent, sintered cemented carbide and/or mixtures thereof. Sintered cemented tungsten carbide particles employed in the hard particle component can have any desired amount of metallic binder. Metallic binder content of sintered cemented tungsten carbide particles can be selected according to several considerations including desired hardness and wear resistance of the particles. In some embodiments, sintered cemented tungsten carbide particles comprise 3 to 20 weight percent metallic binder. Metallic binder of sintered cemented carbide particles can comprise cobalt, nickel, iron, or various alloys thereof.

Tungsten carbide particles can be present in the welding rod in any desired amount. For example, tungsten carbide particles can be present in an amount of at least 40 weight percent of the welding rod. In some embodiments, tungsten carbide particles are present in the welding rod in an amount of 40-80 weight percent or 50-70 weight percent. In some embodiments, the majority of tungsten carbide particles in the welding rod are macrocrystalline tungsten carbide particles. For example, at least 60 percent of the tungsten carbide particles in the welding rod can be macrocrystalline tungsten carbide. In some embodiments, 70-100 percent of the tungsten carbide particles in the welding rod are macrocrystalline tungsten carbide.

In addition to tungsten carbide particles, the hard particle component can also comprise particles of metal carbides, metal nitrides, metal carbonitrides, metal borides, metal silicides, intermetallic compounds or other ceramics or mixtures thereof. In some embodiments, metallic elements of hard particles comprise aluminum, boron, silicon and/or one or more metallic elements selected from Groups IVB, VB, and VIB of the Periodic Table. Groups of the Periodic Table described herein are identified according to the CAS designation. In some embodiments, for example, hard particles comprise carbides of titanium, chromium, molybdenum, zirconium, hafnium, tantalum, niobium, rhenium, vanadium, boron or silicon or mixtures thereof. Hard particles, in some embodiments, comprise nitrides of aluminum, boron, silicon, titanium, zirconium, hafnium, tantalum or niobium, including cubic boron nitride, or mixtures thereof. Additionally, in some embodiments, hard particles comprise borides such as titanium di-boride, $B_4C$ or tantalum borides or silicides such as $MoSi_2$ or $Al_2O_3$—SiN. Hard particles can comprise crushed carbide, crushed nitride, crushed boride, crushed silicide or mixtures thereof. Hard particles in addition to tungsten carbide can have any desired size. In some embodiments, these hard particles have an average size of 10 μm to 100 μm, or greater. In other embodiments, these hard particles have an average size less than 45 μm. For example, the hard particles can have a size selected from Table III herein.

Particles of the hard component can be dispersed uniformly or substantially uniformly in the alloy matrix of the welding rod. Moreover, welding rods described herein can have any dimensions suitable for application of claddings via weld overlay techniques. In some embodiments, welding rods have a circular or elliptical cross-section.

In another aspect, composite articles are described herein. In some embodiments, a composite article comprises a metallic substrate, and a cladding adhered to the substrate, the cladding comprising a hard particle component dispersed in a nickel-based alloy matrix or cobalt-based alloy matrix, the hard particle component comprising tungsten carbide particles having an average size of less than 45 μm, and the nickel-based alloy matrix or cobalt-based alloy matrix comprising at least one metal carbide forming element.

The cladding can be adhered to the metal substrate via a weld overlay process employing welding rod(s) having composition and properties described in herein. Accordingly, the cladding can have any of the compositional properties described in this Section I. For example, the cladding can comprise any nickel-based alloy matrix or cobalt-based alloy matrix set forth above. Additionally, tungsten carbide particles dispersed in the alloy matrix can have compositions described in this Section I and average particles sizes selected from Table III.

Claddings of composite articles can also exhibit desirable wear properties. In some embodiments, a cladding exhibits an erosion rate of less than 0.07 $mm^3$ or less than 0.05 $mm^3$ per gram of erosive media according to ASTM G76—Standard Test Method for Conducting Erosion Tests by Solid Particle Impingement Using Gas Jets. Claddings formed with welding rods described herein can also exhibit an adjusted volume loss of less than 30 $mm^3$ according to ASTM G65—Standard Test Method for Measuring Abrasion Using the Dry Sand/Rubber Wheel Apparatus, Procedure A.

The claddings can be adhered to any desired metallic substrate. Suitable metallic substrates include, but are not limited to, steels, iron-based alloys, nickel-based alloys and cobalt-based alloys. Steels, in some embodiments, comprise carbon steels, alloy steels, tool steels or stainless steels. In one embodiment, for example, a steel substrate has carbon content greater than 0.3 weight percent. Further, nickel-based alloy substrates, in some embodiments, are commercially available under the INCONEL®, HASTELLOY® and/or BALCO® trade designations, and cobalt-based alloy substrates are commercially available under the STELLITE®, HAYNES®, and/or TRIBALOY® trade designations.

Metallic substrates can display various geometries. In some embodiments, a substrate has a cylindrical geometry, wherein the inner diameter (ID) surface, outer diameter (OD) surface or both can be cladded. In some embodiments, for example, metallic substrates comprise wear pads, pelletizing dies, bearings, extruder barrels, extruder screws, flow control components, piping or tubes. Cladded substrates, in some embodiments, are used in oil well and/or gas drilling, petrochemical, power generation, food and pet food industries as well as general engineering applications involving wear, abrasion, corrosion and/or high temperature.

In some embodiments, claddings of composite articles described herein exhibit a worn or eroded surface. Eroded surfaces of a cladding described herein can occur from mechanically working or grinding the cladding after deposition and/or exposure of the cladding to one or more erosive environments, such as when the cladded article is used in its normal course. An eroded surface of the cladding, in some embodiments, has a surface roughness ($R_a$) of less than 10 μm or less than 5 μm. In some embodiments, an eroded cladding surface has a surface roughness of 0.5 μm to 5 μm. Notably, in some embodiments, claddings described herein can exhibit the foregoing surface roughness values at any point of the cladding lifetime. For example, a cladding can have a surface roughness of 0.5 μm to 10 μm with less than 50 percent of the cladding remaining on the metallic substrate. The ability to maintain desirable surface roughness values over the cladding lifetime can be attributed, at least in part, to the fine tungsten carbide particle size of the welding rod, which is carried over to the deposited cladding.

FIG. 1 provides surface roughness values of eroded claddings having structure and composition described herein relative to prior claddings formed from welding rods employing coarse tungsten carbide particles. As illustrated in FIG. 1, eroded surfaces of claddings described herein we substantially smoother, having a roughness generally less than 5 μm.

II. Methods of Cladding Metallic Substrates

In a further aspect, methods of cladding metallic substrates are provided. A method of cladding a metallic substrate, in some embodiments, comprises providing a welding rod comprising a hard particle component dispersed in a nickel-based alloy matrix or cobalt-based alloy matrix, the hard particle component comprising tungsten carbide particles having an average size of less than 45 μm, and the nickel-based alloy matrix or cobalt-based alloy matrix comprising at least one metal carbide forming element. The cladding is deposited on the metallic substrate from the welding rod. Welding rods and associated claddings of methods described herein can have any composition and/or properties described in Section I above.

A welding rod can be provided by blending or mixing the hard particle component with powder nickel-based alloy or powder cobalt-based alloy. Compositional parameters of the mixture can be consistent with the desired compositional parameters of the welding rod, including weight percent and average size of the tungsten carbide particles. The hard particle-powder alloy mixture is combined with organic binder to fabricate a sheet carrying the mixture. The organic binder and hard particle-powder alloy mixture can be mechanically worked or processed to trap the particulate mixture in the organic binder. In one embodiment, for example, the hard particle-powder alloy mixture is combined with 3-15 vol. % PTFE and mechanically worked to fibrillate the PTFE and trap the particulate mixture. Mechanical working can include rolling, ball milling, stretching, elongating, spreading or combinations thereof. In some embodiments, the sheet comprising the hard particle-powder alloy mixture is subjected to cold isostatic pressing. The resulting sheet can have a low elastic modulus and high green strength. In some embodiments, a sheet comprising organic binder and the hard particle-powder alloy mixture is produced in accordance with the disclosure of one or more of U.S. Pat. Nos. 3,743,556, 3,864,124, 3,916,506, 4,194,040 and 5,352,526, each of which is incorporated herein by reference in its entirety.

The sheet is subsequently rolled and cut to the desired length and thickness. The rod-like sheet is then subjected to liquid phase sintering to provide the welding rod. Sintering temperatures and times will be dependent on the specific composition of the powder nickel-based alloy or powder cobalt-based alloy. For several powder alloys described herein, sintering temperatures can generally range from 950° C. to 1300° C. with sintering times of 20 minutes to 2 hours to achieve full or substantially full densification of the welding rod. In some embodiments, the welding rod has less than 2 vol. % porosity or less than 1 vol. % porosity. Alternatively, the hard particle component and powder alloy can be separated into individual sheets. The individual sheets can be formed as described above. Once formed, the sheets can be layered together, rolled and cut to the desired length. Liquid phase sintered is then performed to complete fabrication of the welding rod.

In other embodiments, a welding rod described herein may be fabricated by blending the powder alloy and hard particle component and loading the resulting mixture into a mold having the desired shape and size of the welding rods.

The mixture is subsequently sintered and densified in the mold. In some embodiments, the powder alloy and hard particle component can be layered within the mold, such that the powder alloy infiltrates a hard particle layer during the sintering process.

Welding rods described herein find use with a variety of weld overlay techniques for cladding metallic substrates. Welding rods, for example, can be employed with shielded metal arc welding, $CO_2$ welding, metal inert gas welding (MIG/TIG), submerged arc welding and/or plasma transferred arc (PTA).

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A welding rod comprising:

a hard particle component dispersed in a continuous nickel-based alloy matrix or cobalt-based alloy matrix of the welding rod, the hard particle component comprising tungsten carbide particles having an average size less than 45 μm, and the nickel-based alloy matrix or cobalt-based alloy matrix comprising at least one metal carbide forming element.

2. The welding rod of claim 1, wherein the at least one metal carbide forming element is selected from the group consisting of chromium, molybdenum, titanium, silicon, and boron.

3. The welding rod of claim 2, wherein the at least one metal carbide forming element is present in the nickel-based alloy matrix or cobalt-based alloy matrix in an amount less than 10 weight percent.

4. The welding rod of claim 2, wherein the at least one metal carbide forming element is present in the nickel-based alloy matrix or cobalt-based alloy matrix in an amount less than 5 weight percent.

5. The welding rod of claim 1, wherein the tungsten carbide particles comprise macrocrystalline tungsten carbide, cast tungsten carbide, sintered cemented carbide, or mixtures thereof.

6. The welding rod of claim 5, wherein the sintered cemented carbide particles comprise metallic binder in an amount of 3 to 20 weight percent.

7. The welding rod of claim 1, wherein the hard particle component further comprises particles selected from the group consisting of metal carbides, metal nitrides, and metal carbonitrides.

8. The welding rod of claim 7, wherein the particles of metal carbides, metal nitrides, and metal carbonitrides have an average size of less than 45 μm.

9. The welding rod of claim 1, wherein the hard particle component is present in the welding rod in an amount of at least 40 weight percent.

10. The welding rod of claim 1, wherein the tungsten carbide particles are present in the welding rod in an amount of 40 weight percent to 80 weight percent.

11. The welding rod of claim 1, wherein at least 60 percent of the tungsten carbide particles are macrocrystalline tungsten carbide.

12. The welding rod of claim 1, wherein a portion of the tungsten carbide particles have a size of 20 μm to 40 μm.

13. A method of cladding a metallic substrate comprising:

providing a welding rod comprising a hard particle component dispersed in a nickel-based alloy matrix or cobalt-based alloy matrix, the hard particle component comprising tungsten carbide particles having an average size less than 45 μm, and the nickel-based alloy matrix or cobalt-based alloy matrix comprising at least one metal carbide forming element; and depositing the cladding on the metallic substrate from the welding rod.

14. The method of claim 13, wherein at least 60 percent of the tungsten carbide particles are macrocrystalline tungsten carbide.

15. The method of claim 13, wherein the at least one metal carbide forming element is selected from the group consisting of chromium, molybdenum, titanium, silicon, and boron.

16. The method of claim 13, wherein the tungsten carbide particles comprise macrocrystalline tungsten carbide, cast tungsten carbide, sintered cemented carbide, or mixtures thereof.

17. The method of claim 13, wherein the tungsten carbide particles are present in the welding rod in an amount of 40 weight percent to 80 weight percent.

18. The method of claim 17, wherein a portion of the tungsten carbide particles have a size of 20 μm to 40 μm.

19. The method of claim 13, wherein the cladding has an erosion rate of less than 0.07 $mm^3$ per gram of erosive media according to ASTM G76.

20. The method of claim 13, wherein the cladding has an adjusted volume loss of less than 30 $mm^3$ according to ASTM G65- Procedure A.

21. The method of claim 13 further comprising eroding a surface of the cladding, wherein the eroded surface has a roughness ($R_a$) of less than 10 μm.

22. The method of claim 21, wherein the eroded surface has a roughness ($R_a$) of less than 5 μm.

* * * * *